United States Patent
Kidani

(10) Patent No.: US 12,436,514 B2
(45) Date of Patent: Oct. 7, 2025

(54) METHOD FOR SIMULATING PROCESSING STATE OF BELT-SHAPED BODY

(71) Applicant: CHUGAI RO CO., LTD., Osaka (JP)

(72) Inventor: Yuji Kidani, Osaka (JP)

(73) Assignee: CHUGAI RO CO., LTD., Osaka (JP)

( * ) Notice: Subject to any disclaimer, the term of this patent is extended or adjusted under 35 U.S.C. 154(b) by 482 days.

(21) Appl. No.: 17/920,197

(22) PCT Filed: Dec. 9, 2020

(86) PCT No.: PCT/JP2020/045831
§ 371 (c)(1),
(2) Date: Oct. 20, 2022

(87) PCT Pub. No.: WO2021/220545
PCT Pub. Date: Nov. 4, 2021

(65) Prior Publication Data
US 2023/0251612 A1    Aug. 10, 2023

(30) Foreign Application Priority Data

Apr. 30, 2020 (JP) ................................ 2020-080009

(51) Int. Cl.
*G05B 17/02* (2006.01)
*F27D 19/00* (2006.01)
(Continued)

(52) U.S. Cl.
CPC ............. *G05B 17/02* (2013.01); *F27D 19/00* (2013.01); *F27D 2019/0096* (2013.01)

(58) Field of Classification Search
CPC . G05B 17/02; F27D 19/00; F27D 2019/0096; F27D 2019/0071;
(Continued)

(56) References Cited

U.S. PATENT DOCUMENTS

| 2011/0295563 A1* | 12/2011 | McDaniel | G06F 30/20 |
| | | | 700/98 |
| 2012/0041726 A1* | 2/2012 | Wang | C21D 1/60 |
| | | | 703/2 |
| 2016/0340761 A1* | 11/2016 | Garza-Martinez | C22C 38/04 |

FOREIGN PATENT DOCUMENTS

| JP | 52-26723 A | 2/1977 |
| JP | S61-177328 A | 8/1986 |

(Continued)

OTHER PUBLICATIONS

International Search Report dated Mar. 2, 2021, issued in counterpart International Application No. PCT/JP2020/045831. (2 pages).

(Continued)

*Primary Examiner* — Michael J Brown
(74) *Attorney, Agent, or Firm* — WHDA, LLP

(57) ABSTRACT

In the detection of a state where a belt-shaped body W is processed as conveyed through a furnace 10, a conveyance route R for conveying the belt-shaped body through the furnace is set and a processing condition for processing the belt-shaped body in the furnace as conveying the belt-shaped body along the conveyance route is set. A fluid analysis is performed on the assumption that a highly viscous fluid Wa having the same characteristic as that of the belt-shaped body flows along the conveyance route at the same speed as that of the belt-shaped body. The processing state of the belt-shaped body conveyed through the furnace is simulated.

5 Claims, 4 Drawing Sheets

(51) Int. Cl.
*C21D 1/26* (2006.01)
*G06F 30/28* (2020.01)

(58) Field of Classification Search
CPC .. G06F 2111/10; G06F 2119/08; G06F 30/28; C21D 9/0056; C21D 9/56; C21D 11/00; C21D 1/26
USPC .......................................................... 700/90
See application file for complete search history.

(56) References Cited

FOREIGN PATENT DOCUMENTS

| JP | 63-66883 A | 3/1988 |
|---|---|---|
| JP | 4-72022 A | 3/1992 |
| JP | 2009-98030 A | 5/2009 |
| JP | 5118393 B2 | 1/2013 |

OTHER PUBLICATIONS

Office Action dated Dec. 26, 2024, issued in counterpart CN application No. 202080099348.4, with Partial English translation. (12 pages).
Sun Hongquan, "Fluid-Deformable Solid Interaction Simulation Based on the SPH Method", Journal of Natural Sciences of Heilongjiang University, Oct. 31, 2012, p. 691, paragraph 2, with English abstract; (11 pages).
Extended (Supplementary) European Search Report dated Apr. 2, 2024, issued in counterpart EP application No. 20933913.4. (10 pages).
Fu-Yong, Su and Zhi, Li, "Numerical Simulation of Temperature and Flow Field in Horizontal Continuous Annealing Furnace", Research Journal of Applied Sciences, Engineering and Technology, Jul. 5, 2013, vol. 6, No. 7, pp. 1322-1325, (4 pages).
Carvalho, S. R. et al., "A mathematical and computational model of furnaces for continuous steel strip processing", Journal of Materials Processing Technology, Elsevier, NL, Sep. 14, 2006, vol. 178, No. 1-3, pp. 379-387, (9 pages).
Zareba, S. et al., "Mathematical modelling and parameter identification of a stainless steel annealing furnace", Simulation Modelling Practice and Theory, vol. 60, pp. 15-39, ( 25 pages).
Notification of Transmittal of Copies of Translation of the International Preliminary Report on Patentability (Form PCT/IB/338) issued in counterpart International application No. PCT/JP2020/045831 mailed Nov. 10, 2022 with Forms PCT/IB/373 and PCT/ISA/237, with English translation. (9 pages).
Notification Concerning Transmittal of Translation of the International Preliminary Report on Patentability (Form PCT/IB/326) issued in counterpart International application No. PCT/JP2020/045831 mailed Nov. 10, 2022 with Forms PCT/IB/373 and PCT/ISA/237, with English translation. (9 pages).
Office Action dated Jun. 28, 2025, issued in counterpart CN Application No. 202080099348.4. (6 pages).
Huang, M. et al., A Coupled Numerical Study of Slab Temperature and Gas Temperature in the Walking-Beam-Type Slab Reheating Furnace, Numerical Heat Transfer, Part A: Applications, p. 625-646, 2008 (23 pages); cited in CN Office Action dated Jun. 28, 2025.
Oh, J. et al., Numerical Investigation on Energy Performance of Hot Stamping Furnace, Applied Thermal Engineering, p. 694-706, 2018(53 pages); cited in CN Office Action dated Jun. 28, 2025.

\* cited by examiner

METHOD FOR SIMULATING PROCESSING STATE OF BELT-SHAPED BODY

TECHNICAL FIELD

The present invention relates to a method for simulating a processing state of a belt-shaped body where a state of the belt-shaped body processed as conveyed through a furnace is simulated. Particularly, the invention offers a feature that in the case of processing the belt-shaped body by conveying the belt-shaped body through the furnace, conditions in the furnace including temperature, air flow and the like in the furnace are so simulated as to provide for a proper simulation of a processing state of the belt-shaped body conveyed through the furnace, although a variety of data pieces such as temperature and air flow in the furnace are not acquired by repeating many times an experiment of heat processing the belt-shaped body in the furnace.

BACKGROUND ART

It has been a conventional practice to continuously heat process the belt-shaped body made of steel belt or the like while conveying the belt-shaped body through the furnace as suggested in patent document 1, patent document 2 and the like.

When the belt-shaped body made of steel belt or the like is continuously heat-processed as conveyed through the furnace, the following temperature control method for steel belt continuous heating furnace is used for temperature control of a continuous heating furnace for continuously heat processing the belt-shaped body. As set forth in patent document 3, for example, a continuous steel belt formed by welding together a tail end of a preceding steel belt and a head end of a succeeding steel belt is heated as passed through a heating zone of the steel belt continuous heating furnace. Then the continuous steel belt is slowly cooled as passed through a slow cooling zone where a cooling air is blown in by means of an air blower. A slow cooling process for the preceding steel belt except for the tail end thereof is performed under feedback control of plate temperature in the slow cooling zone. A slow cooling of the tail end of the preceding steel belt and the succeeding steel belt continuous thereto is performed under feedforward control provided for a length of time set by a timer. Each time an operating condition is changed, the length of time of the feedforward control is set by the timer.

According to the feedback control of the patent document 3, the plate temperature is PID controlled based on an outlet side plate temperature of the preceding steel belt outgoing from the slow cooling zone. The feedforward control is provided as follows. An experimental expression necessary for determining a revolving speed N of the blower is previously obtained. The experimental expression is determined by learning relations among blower revolving speed, forced convection heat transfer coefficient when cooling the continuous steel belt by blowing a cooling air onto the continuous steel belt passing through the slow cooling zone, and a blowing distance from an outlet port of the cooling air to the continuous steel belt. The revolving speed N of the blower during the feedforward control is set as follows. A forced convection heat transfer coefficient is calculated using a forced convection heat transfer coefficient prediction expression which includes as parameters: a thickness of the continuous steel belt entering the slow cooling zone; a line speed of the continuous steel belt entering the slow cooling zone; an inlet side plate temperature set value of the continuous steel belt entering the slow cooling zone; an outlet side plate temperature set value of the continuous steel belt outgoing from the slow cooling zone; and an air temperature of the cooling air blown onto the continuous steel belt. A predicted revolving speed is obtained by substituting the resultant forced convection heat transfer coefficient into the above-described experimental expression. A range of the blower revolving speed N is defined by multiplying the above predicted revolving speed by a coefficient of 0.9 or more and by multiplying the above predicted revolving speed by a coefficient of 1.1 or less. The blower revolving speed N during the feedforward control is set to a value in the above-described range. In a case where the blower revolving speed N during the feedforward control is less than a predetermined minimum revolving speed and the outlet side plate temperature of the continuous steel belt outgoing from the slow cooling zone is less than an outlet side plate temperature of the continuous steel belt outgoing from the slow cooling zone, the revolving speed N of the blower is set to the minimum revolving speed while the furnace temperature is controlled by means of a heater disposed at the slow cooling zone.

According to the patent document 3, the temperature of the steel belt outgoing from the slow cooling zone of the steel belt continuous heating furnace is controlled as follows. The continuous steel belt formed by welding together the tail end of the preceding steel belt and the head end of the succeeding steel belt is heated as passed through the heating zone of the steel belt continuous heating furnace and is slowly cooled as passed through the slow cooling zone into which the cooling air is blown by the blower. In this process, the slow cooling process for the preceding steel belt except for the tail end thereof is performed while controlling the plate temperature in the slow cooling zone based on the feedback control. The slow cooling process for the tail end of the preceding steel belt and the succeeding steel belt continuous thereto is performed based on the feedforward control for a period set by a timer at each change of the operating condition.

According to the method set forth in the patent document 3, the furnace temperature is controlled as follows. In the above-described feedforward control, the experimental expression necessary for determining the revolving speed N of the blower under different conditions is previously obtained. The forced convection heat transfer coefficient is calculated from the forced convection heat transfer coefficient prediction expression. A predicted revolving speed is obtained by substituting the forced convection heat transfer coefficient, as a predetermined parameter, into the experimental expression. The revolving speed N of the blower is set based on the resultant predicted revolving speed. During the feedforward control, the above-described blower revolving speed N is compared with a predetermined minimum revolving speed. Based on the outlet side plate temperature of the continuous steel belt outgoing from the slow cooling zone, the blower revolving speed N is set to the above-described minimum revolving speed. Thus, the furnace temperature is controlled by means of the heater disposed in the slow cooling zone.

According to the furnace temperature control disclosed 10 in the patent document 3, however, the continuous steel belt formed by welding together the tail end of the preceding steel belt and the head end of the succeeding steel belt is continuously heated by practically conveying the continuous steel belt through the continuous heating furnace while the temperature of the steel belt outgoing from the slow cooling zone of the steel belt continuous heating furnace is simply controlled. This control method is not adapted to simulate the processing state of a variety of belt-shaped bodies heated as conveyed through a variety of continuous heating furnaces. In addition, extremely complicated calculations and controls are required for controlling the temperature of the steel belt outgoing from the slow cooling zone of the steel belt continuous heating furnace.

Patent document 4 discloses a continuous annealing furnace where strips having different plate thicknesses, plate widths or heating furnace outlet temperature standards are continuously threaded through the heating furnace for continuous annealing. When the plate thickness, plate width, and heating furnace outlet temperature standard (plate temperature standard) are changed (set change), or when a center line speed is changed and/or a fuel flow rate of the heating furnace is changed as an operation amount in a constant period in a coil and a strip temperature (plate temperature) of the heating furnace outlet is controlled, the plate temperature in a period ranging from the present to the future is consecutively predicted and/or the furnace temperature in a period ranging from the present to the future is consecutively predicted. A fuel flow rate for optimizing a deviation between a target plate temperature and the predicted plate temperature and/or a deviation between a target furnace temperature and the predicted furnace temperature, and a predetermined evaluation function based on the variation of the fuel flow rate of the heating furnace is calculated and the plate temperature is controlled.

According to the patent document 4, the strip temperature (plate temperature) of the heating furnace outlet is controlled as follows. A known plate temperature prediction model for predicting the plate temperature from the furnace temperature, fuel flow rate, plate thickness, plate width and center line speed is used. Further, a zone furnace temperature prediction model for predicting the furnace temperature of each zone based on the fuel flow rate, plate thickness, plate width and center line speed is provided. The plate temperature and the zone furnace temperature are consecutively predicted by means of these models. Subsequently, actual figures of the plate temperature, zone furnace temperature, fuel flow rate, plate thickness, plate width and center line speed are individually sampled in a predetermined period and inputted to the above-described plate temperature prediction model and zone furnace temperature prediction model. The plate temperature and the zone furnace temperature are consecutively predicted by repeating these operations. Further, an evaluation function is set by consecutively evaluating a deviation between the predicted plate temperature as described above and a target plate temperature, a deviation between the predicted zone furnace temperature and a target zone furnace temperature, and a variation of the fuel flow rate. An optimum fuel flow rate is calculated based on the evaluation function and the plate temperature is controlled accordingly.

According to the patent document 4, however, the plate temperature and the zone furnace temperature are predicted by using the known plate temperature prediction model for prediction of the plate temperature based on the furnace temperature, the fuel flow rate, the plate thickness, the plate width, and the center line speed. This dictates the need for a preliminary collection of such data pieces, resulting in difficulty in handling a novel furnace or plate material, about which no data is available. Even after the prediction of the plate temperature and the zone furnace temperature as described above, it is still necessary to periodically sample the actual figures for the plate temperature, zone furnace temperature, fuel flow rate, plate thickness, plate width and center line speed individually and to correct these figures. This makes it an extremely troublesome and difficult task to adequately control the plate temperature. There has been a problem that, in a variety of continuous heating furnaces, it is impossible to properly simulate the processing state of a variety of belt-shaped bodies as conveyed through the furnace.

Since a simulation method for gas is different from a simulation method for solid mass, the simulation of the temperature change of the steel belt (solid mass) moved through the gas (fluid) in the furnace requires extremely complicated calculations. What is more, the calculation results suffer from low reliability.

CITATION LIST

Patent Documents

Patent Document 1: Published Japanese Patent Application No. S63(1988)-66883
Patent Document 2: Published Japanese Patent Application No. S52(1977)-26723
Patent Document 3: Published Patent Application No. 5118393
Patent Document 4: Published Japanese Patent Application No. H4(1992)-72022

DISCLOSURE OF INVENTION

Technical Problem

In simulating the state where the belt-shaped body is processed as conveyed through the furnace, an object of the invention is to provide a proper simulation of the processing state of the belt-shaped body conveyed through the furnace by simulating the conditions such as the temperature and air flow in the furnace although a variety of data pieces are not acquired by repeating many times experiments of processing the belt-shaped body as conveying the belt-shaped body through the furnace.

Solution to Problem

In a method for simulating a processing state of a belt-shaped body processed as conveyed through a furnace according to an aspect of the invention for achieving the above object, a conveyance route for conveying the belt-shaped body through the furnace is configured and a processing condition for processing the belt-shaped body in the furnace as conveying the belt-shaped body along the conveyance route is set, a fluid analysis is performed on the assumption that a highly viscous fluid having the same characteristic as that of the belt-shaped body flows along the conveyance route at the same speed as the that of the belt-shaped body, and the processing state of the belt-shaped body conveyed through the furnace is simulated. It is noted here that a commercially available fluid analysis software (ANSYS Fluent: ANSYS Inc) is usable when performing the fluid analysis as described above.

If the conveyance route for conveying the belt-shaped body through the furnace is configured and the processing conditions for processing the belt-shaped body in the furnace as conveying the belt-shaped body along the conveyance route are set as suggested by the method for simulating the processing state of the belt-shaped body according to the invention, in the same manner that the belt-shaped body is conveyed through the furnace, a state where the temperature, air flow and the like in the furnace change due to the highly viscous fluid flowing along the conveyance route is simulated. Analysis of the state of the highly viscous fluid flowing along the conveyance route provides for the simulation of the processing state of the belt-shaped body conveyed through the furnace.

It is noted here that the belt-shaped body according to the invention may be any solid mass which includes metallic steel belts, fabrics, papers, resin films and the like.

According to the invention, the solid mass is assumed to have such a "viscosity" that unlikely exists in solid so as to be considered as a fluid so that the calculation can be made on two different fluids rather than on a combination of a fluid and a solid. Therefore, the simulation methods are unified and facilitated.

In the method for simulating the processing state of the belt-shaped body according to the invention, the above-described highly viscous fluid is configured to flow in a laminar flow along the conveyance route rather than in a turbulent flow. Accordingly, if the highly viscous fluid is configured to flow in the laminar flow along the conveyance route, the highly viscous fluid flowing along the conveyance path is prevented from flowing in disturbance so that the viscous fluid is analyzed in the same state as the belt-shaped body. This ensures that the processing state of the belt-shaped body conveyed along the conveyance route can be accurately simulated.

In the method for simulating the processing state of the belt-shaped body according to the invention, the highly viscous fluid is simulated with the setting of the characteristics such as thickness, width, density, specific heat, and heat thermal conductivity of the belt-shaped body to be simulated. This ensures that a simulation can be performed in correspondence to the belt-shaped body which is in actual use.

In the method for simulating the processing state of the belt-shaped body according to the invention, the above-described highly viscous fluid is defined to have a viscosity of 0.6 mPa·s or more. This ensures that a state where the temperature, air flow and the like in the furnace are varied due to the highly viscous fluid flowing along the conveyance route are stabilized and simulated. Thus, the simulation in correspondence to the belt-shaped body can be performed.

The belt-shaped body according to the invention is characterized by being formed of a metal material. It is an industrially common practice to heat process the belt-shaped metal at high temperatures in the furnace. This provides for the most effective utilization of the above-described simulation method.

Advantageous Effects of Invention

In the simulation of the state of the belt-shaped body processed as conveyed through the furnace, the conveyance route for conveying the above-described belt-shaped body in the furnace is configured and processing conditions for processing the belt-shaped body in the furnace as conveying the belt-shaped body along the conveyance route are set. The fluid analysis is performed on the assumption that the highly viscous fluid having the same characteristics as those of the belt-shaped body flows along the conveyance route at the same speed as that of the belt-shaped body. Just as in the case where the belt-shaped solid mass is conveyed along the conveyance route in the furnace, the state where the temperature, air flow and the like in the furnace change due to the highly viscous fluid flowing along the conveyance route is simulated. Thus, the analysis of the state of the highly viscous fluid flowing along the conveyance route provides for the simulation of the processing state of the belt-shaped body conveyed through the furnace.

According to the method for simulating the processing state of the belt-shaped body of the invention, therefore, the detection of the state of the belt shaped body conveyed and processed in the air of the furnace does not require the acquisition of various data pieces by making complicated calculations or repeating many times experiments of conveying and heat processing the belt-shaped body in the furnace. By way of fluid analysis of analyzing the state of the highly viscous fluid flowing along the conveyance route in the furnace, conditions in the furnace such as temperature and air flow can be simulated. Thus, the processing state of the belt-shaped body conveyed through the furnace can be simulated in a simple and proper manner.

BRIEF DESCRIPTION OF DRAWINGS

FIG. 1A is a vertical sectional view of the furnace vertically cut away in a direction of conveying the belt-shaped body. FIG. 1B is a horizontal sectional view illustrating the furnace horizontally cut away in the direction of conveying the belt-shaped body. FIG. 1C is an orthogonal sectional view illustrating the furnace cut away in a direction orthogonal to the direction of conveying the belt-shaped body.

FIGS. 3A-3C are a set of diagrams showing a heating element used for heating the inside of the furnace according to the embodiment. FIG. 3A is a schematic perspective view of a bottom heating element arranged in the furnace over a hearth thereof in a manner to define a proper gap. FIG. 3B is a schematic perspective view of a side heating element arranged in the furnace in a manner to define a gap from a furnace wall.

BEST MODE FOR CARRYING OUT THE INVENTION

A Method for simulating a processing state of the belt-shaped body according to an embodiment of the invention will hereinbelow be described in detail with reference to the accompanying drawings. It is noted that the method for simulating the processing state of the belt-shaped body according to the embodiment is not limited to the following embodiment and various changes and modifications can be made thereto unless otherwise such changes and modifications depart from the scope of the present invention.

Figure 1A:
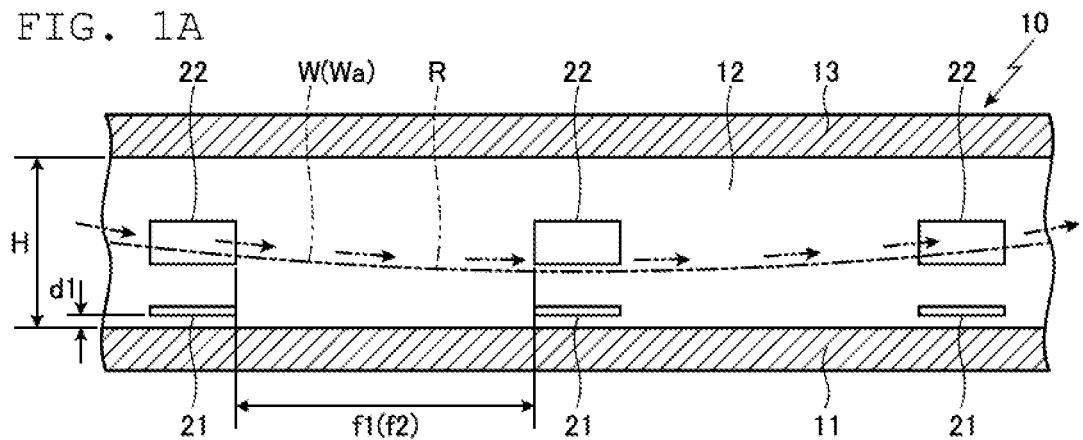
FIGS. 1A-1C are a set of diagrams showing internal states of a furnace inside of which the belt-shaped body is conveyed and processed in a method for simulating the processing state of the belt-shaped body according to an embodiment of the invention.
Figure 1B:
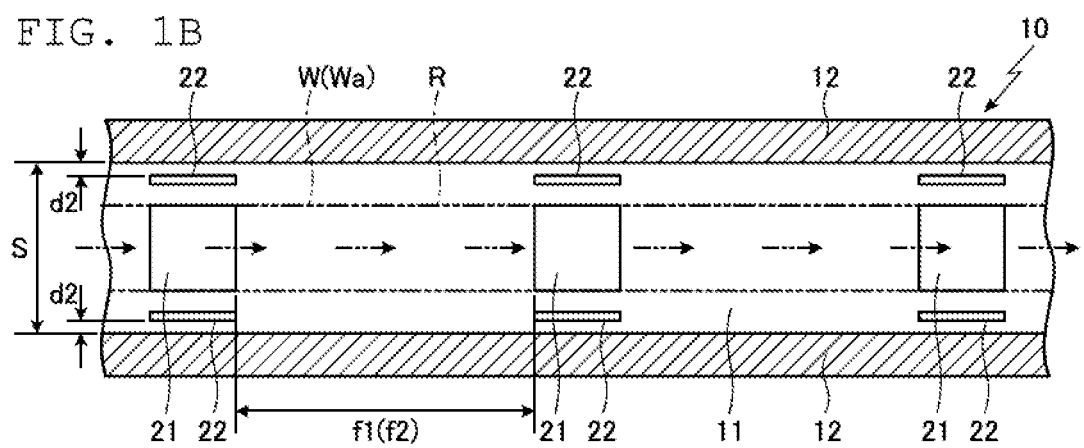
Figure 1C:
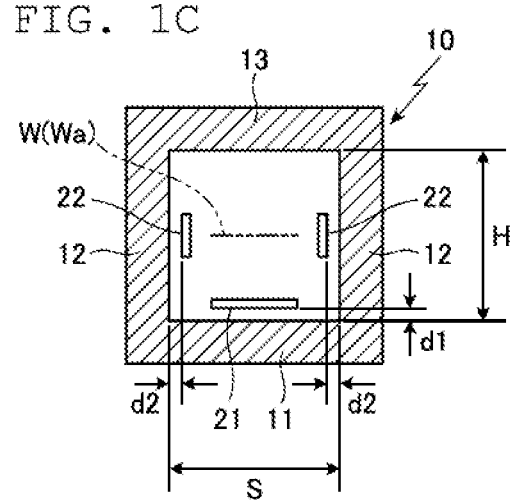
Figure 2:
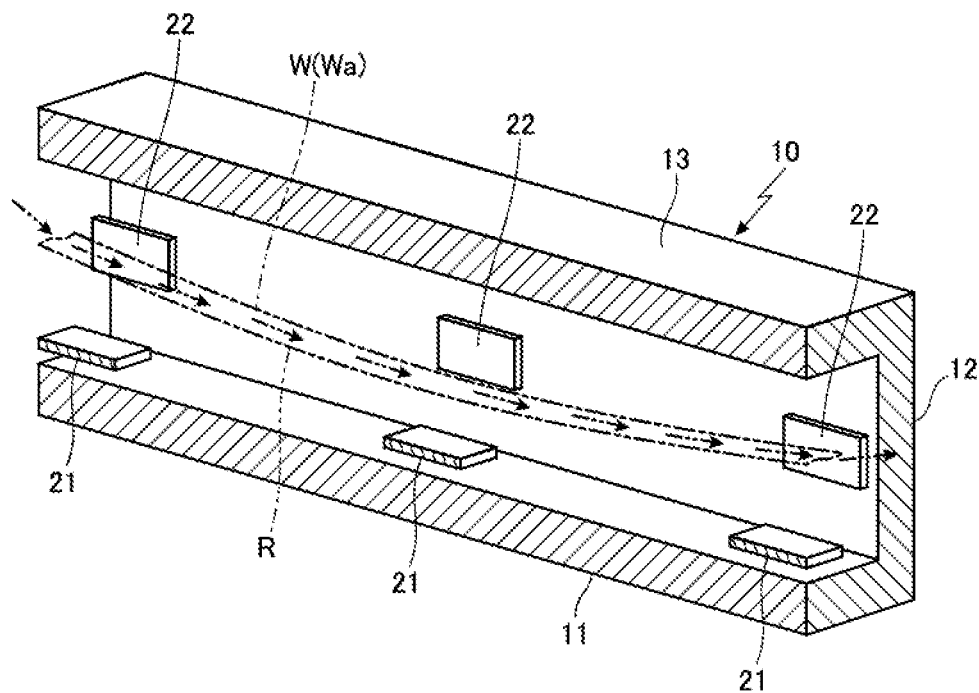
FIG. 2 is a schematic sectional view illustrating how the belt-shaped body is conveyed along a conveyance route in the furnace inside of which is heated according to the above embodiment.

According to the embodiment, as shown in FIG. 1A, FIG. 1B and FIG. 1C, the inside of a furnace 10 formed in a rectangular tube shape is heated. The furnace 10 is formed of a hearth 11; furnace walls 12 on both sides of the hearth 11; and a furnace ceiling 13, all of which are comprised of heal insulating materials. The inside of the furnace 10 is heated. In the furnace 10 thus heated, as shown in FIG. 2, a state where a belt-shaped body W made of a steel belt or the like is heat-processed as conveyed in a longitudinal direction of the furnace 10 is simulated.

According to the embodiment, the following arrangement is made for heating the inside of the furnace 10 as described above. In the furnace 10, plate-shaped bottom heating elements 21 are sequentially arranged in the longitudinal direction of the furnace 10 at required intervals and in a manner to have an adequate gap over the hearth 11. A pair of side heating elements 22 are sequentially arranged in the longitudinal direction of the furnace 10 at required intervals and in a manner to have an adequate gap from the respective furnace walls 12 on both sides of the hearth 11.

The individual bottom heating elements 21 and the respective pairs of side heating elements 22 arranged in the furnace 10 as described above are activated to heat the inside of the furnace 10. In the furnace 10 thus heated, the belt-shaped body W is heat-processed while conveying the belt-shaped body W along the conveyance route R. An operation of simulating the processing state of the belt-shaped body W is described in detail.

According to this embodiment, the above-described furnace 10 includes the hearth 11, the furnace walls 12 and the furnace crown 13 each formed of the heat insulating material having a thickness of 500 mm, and the inside of the furnace has a width S of 2000 mm and a height H of 2000 mm.

Figure 3A:
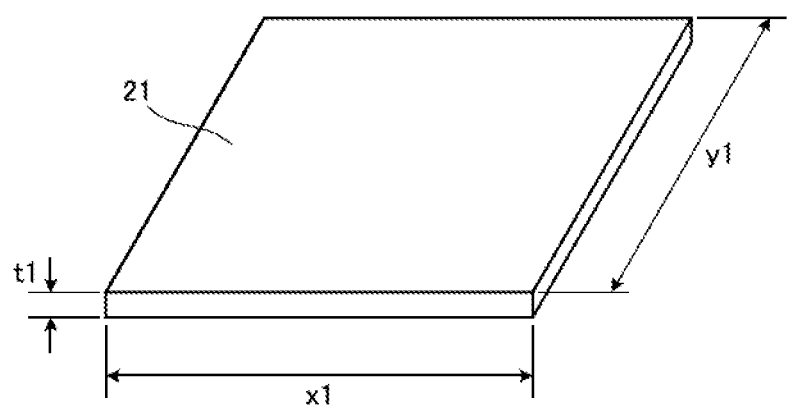
Figure 3B:
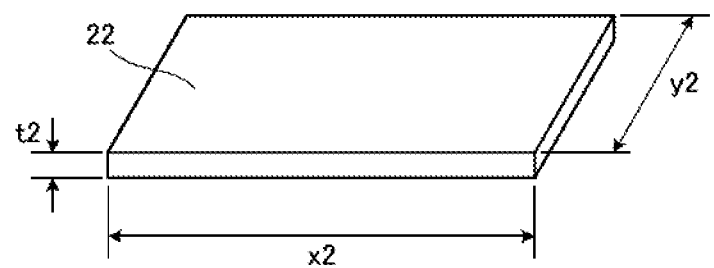

As shown in FIG. 3A, the above-described bottom heating element 21 is shaped like a square plate which has a thickness t1 of 10 mm, a transverse length x1 of 1000 mm and a longitudinal length y1 of 1000 mm. As shown in FIG. 3B, the above-described side heating element 22 is shaped like a rectangular plate which has a thickness t2 of 10 mm, a transverse length x2 of 1000 mm and a longitudinal length y2 of 500 mm.

According to the embodiment, the above-described bottom heating elements 21 are located at the center of a furnace width direction as spaced 500 mm away from the respective furnace walls 12 on both sides of the furnace 10. The bottom heating elements 21 are sequentially arranged over the hearth 11 via a gap d1 of 150 mm and in a manner to have an interval f1 of 3500 mm between respective pairs of the bottom heating elements in a longitudinal direction of the furnace 10. The above-described side heating elements 22 are arranged in a manner that the transverse sides thereof are aligned in the longitudinal direction of the furnace 10, and that the side heating elements 22 are located at the center of a height direction of the furnace 10 as spaced 750 mm away from the hearth 11 and the furnace crown 13 respectively. The side heating elements 22 have a gap d2 of 150 mm from the respective furnace wall 12 on both sides and are sequentially arranged in a manner that each of the adjacent side heating elements 22 have an interval f2 of 3500 mm therebetween in the longitudinal direction of the furnace 10. An exothermic temperature of the individual bottom heating elements 21 and side heating elements 22 are set to 1394° C. for heating the inside of the furnace 10.

According to the embodiment, an iron-based metal is assumed to be used for the belt-shaped body W to be heat-processed in the furnace 10 thus heated. The belt-shaped body W that has a width of 1000 mm, a thickness of 1 mm, a density of 8000 kg/m³, and a specific heat of 500 J/kg/K/is used. The processing state of the belt-shaped body W in a case where the belt-shaped body W is conveyed along the conveyance route R in the furnace 10 at a feeding speed of 0.633 m/s and heat-processed is simulated.

Figure 4:
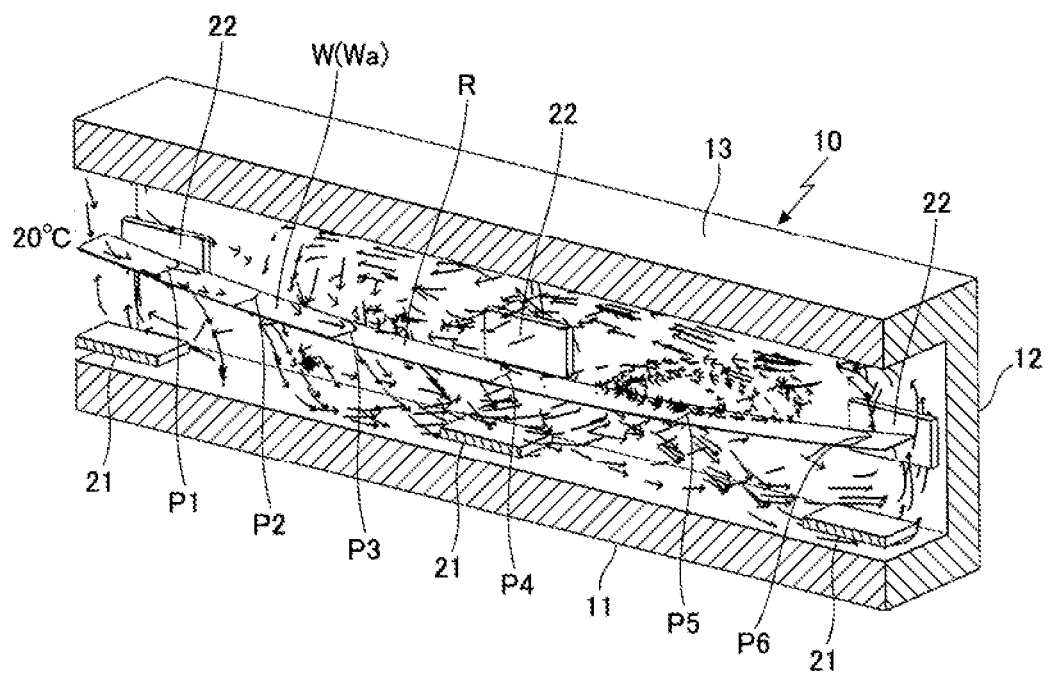
FIG. 4 is a schematic sectional diagram illustrating the results of a simulation according to the above embodiment where a fluid analysis is performed on the assumption that a highly viscous fluid having the same characteristic as that of the belt-shaped body flows along the conveyance route for conveying the belt-shaped body in the furnace, and where the states of the air flow and the like in the furnace and a heating state of the highly viscous fluid (belt-shaped body) conveyed in the furnace are simulated.

In simulating the processing state of the belt-shaped body W as described above, in place of the above-described solid belt-shaped body W, a highly viscous fluid Wa having the same width, thickness, density and specific heat as those of the above-described belt-shaped body W and having a high viscosity of 0.6 mPa·s or more is set to flow in the laminar flow along the conveyance route R in the furnace 10 at the same feed speed of 0.633 m/s as that of the belt-shaped body W. A fluid analysis is performed by using a commercially available fluid analysis software (ANSYS Fluent: ANSYS Inc). Conditions such as temperature, air flow and the like in the furnace 10 and the temperature condition of the highly viscous fluid Wa conveyed in the furnace 10 are simulated. The results are shown in FIG. 4. The higher viscosity has the above-described fluid Wa, the closer to the solid state is the fluid Wa. However, the experimental results show little change when the viscosity exceeds 0.6 mPa·s.

FIG. 4 shows results of the following simulation. In a case where the highly viscous fluid Wa is conveyed through the furnace 10 from an inlet of the furnace 10 at the temperature of 20° C., a state where the highly viscous fluid Wa is raised in temperature as gradually heated while moved from the inlet to the outlet of the furnace 10 along the conveyance route R and a state of the air flow and the like in the furnace 10 are simulated. In FIG. 4, P1 denotes a position where the above-described highly viscous fluid Wa is heated to a temperature of 100° C., P2 denotes a position where the highly viscous fluid is heated to 200° C., P3 denotes a position where the highly viscous fluid is heated to 300° C., P4 denotes a position where the highly viscous fluid is heated to 400° C., P5 denotes a position where the highly viscous fluid is heated to 500° C., and P6 denotes a position where the highly viscous fluid is heated to 600° C.

The simulation performed on the assumption that the highly viscous fluid Wa having the same characteristic as that of the belt-shaped body W flows along the conveyance route R through the furnace 10 under the same conditions as those of the belt-shaped body W shows results close to those of the simulation of the state where the belt-shaped body W is actually heat-processed as conveyed along the conveyance route R through the furnace 10. It is thus found that a simulation of a solid mass moved through air in the furnace 10 can be accomplished easily, although such a simulation used to be very difficult.

Therefore, if the state of the belt-shaped boy W heat-processed as conveyed through the furnace 10 is simulated according to the embodiment, the following effect is obtained. Even though the experiment of heat-processing the belt-shaped body W while conveying the belt-shaped body W through the furnace 10 is not repeated many times, the state of the belt-shaped body W heated and processed in the furnace 10 as conveyed through the furnace 10 can be easily and properly simulated.

REFERENCE SIGNS LIST

10: furnace
11: hearth
12: furnace wall
13: furnace crown
21: bottom heating element
22: side heating element
H: inside height of furnace
S: inside width of furnace R: conveyance route
W: belt-shaped body
Wa: highly viscous fluid
d1: gap between bottom heating element and hearth
d2: gap between side heating element and furnace wall
f1: longitudinal interval between bottom heating elements in furnace
f2: longitudinal interval between side heating elements in furnace
t1: thickness of bottom heating element
t2: thickness of side heating element
x1: transverse length of bottom heating element
x2: transverse length of side heating element
y1: longitudinal length of bottom heating element
y2: longitudinal length of side heating element

What is claimed is:

1. A method for simulating a processing state of a belt-shaped body in which a state where the belt-shaped body that is processed as conveyed through a furnace is simulated, wherein
    a conveyance route for conveying the belt-shaped body through the furnace is set and
        a processing condition for processing the belt-shaped body in the furnace as conveying the belt-shaped body along the conveyance route is set,
        a fluid analysis is performed on the assumption that a highly viscous fluid having the same characteristic as that of the belt-shaped body flows along the conveyance route at the same speed as that of the belt-shaped body, and
    the processing state of the belt-shaped body conveyed through the furnace is simulated.

2. The method for simulating the processing state of the belt-shaped body according to claim 1, wherein
    the highly viscous fluid is configured to flow in a laminar flow along the conveyance route.

3. The method for simulating the processing state of the belt-shaped body according to claim 1, wherein
    the highly viscous fluid is simulated with the setting of the characteristics such as thickness, width, density, specific heat, and heat thermal conductivity of the belt-shaped body to be simulated.

4. The method for simulating the processing state of the belt-shaped body according to claim 1, wherein
    the viscosity of the highly viscous fluid is set to 0.6 mPa·s or more.

5. The method for simulating the processing state of the belt-shaped body according to claim 1, wherein
    the belt-shaped body to be simulated is made of metal.

* * * * *